United States Patent
Yoshida et al.

(10) Patent No.: US 7,268,816 B2
(45) Date of Patent: Sep. 11, 2007

(54) CAMERA UNIT HAVING LENSES MOUNTED IN MOVABLE ELEMENTS WHICH ARE MADE TO ABUT AGAINST A MOVEMENT REGULATING MEMBER

(75) Inventors: Mitsunobu Yoshida, Kawasaki (JP); Akihiro Koga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 736 days.

(21) Appl. No.: 10/668,157

(22) Filed: Sep. 24, 2003

(65) Prior Publication Data

US 2004/0119870 A1 Jun. 24, 2004

(30) Foreign Application Priority Data

Sep. 27, 2002 (JP) .............................. 2002-283518

(51) Int. Cl.
*H04N 5/225* (2006.01)
(52) U.S. Cl. .................... 348/335; 348/374; 348/347; 348/219.1; 396/133
(58) Field of Classification Search ................ 348/374, 348/347, 335, 208, 219.1; 396/133
See application file for complete search history.

(56) References Cited

U.S. PATENT DOCUMENTS

| | | | | |
|---|---|---|---|---|
| 5,400,070 A | * | 3/1995 | Johnson et al. | 348/219.1 |
| 5,561,460 A | * | 10/1996 | Katoh et al. | 348/219.1 |
| 5,933,187 A | * | 8/1999 | Hirasawa et al. | 348/240.99 |
| 6,134,057 A | * | 10/2000 | Ueyama et al. | 359/821 |
| 6,236,431 B1 | * | 5/2001 | Hirasawa et al. | 348/240.99 |
| 6,611,079 B2 | | 8/2003 | Koga et al. | |
| 6,804,068 B2 | * | 10/2004 | Sasaki et al. | 359/811 |
| 6,836,057 B2 | * | 12/2004 | Hata | 310/328 |

FOREIGN PATENT DOCUMENTS

| | | |
|---|---|---|
| JP | 11-281870 | 10/1999 |
| JP | 2000-28895 | 1/2000 |

OTHER PUBLICATIONS

U.S. Appl. No. 11/377,191, filed Mar. 17, 2006, Akiba et al.
U.S. Appl. No. 11/230,488, filed Sep. 21, 2005, Koga et al.
U.S. Appl. No. 11/233,091, filed Sep. 23, 2005, Koga et al.
U.S. Appl. No. 11/088,894, filed Mar. 25, 2005, Yoshida.
U.S. Appl. No. 11/090,153, filed Mar. 28, 2005, Yoshida.

(Continued)

*Primary Examiner*—David Ometz
*Assistant Examiner*—Usman Khan
(74) *Attorney, Agent, or Firm*—Oblon, Spivak, McClelland, Maier & Neustadt, P.C.

(57) ABSTRACT

Electrode substrates, a movable element which can freely move reciprocally by being guided by the electrode substrates, and in which electrodes are formed on a pair of surfaces thereof facing one another, and which has a lens, an image pickup element imaging an image which was image-formed by the lens, a control unit controlling a position of the movable element, and a stopper regulating movement of the movable element within the movable range thereof. The control unit positions the movable element at a predetermined position by making the movable element abut the stopper.

1 Claim, 9 Drawing Sheets

OTHER PUBLICATIONS

U.S. Appl. No. 10/950,449, filed Sep. 28, 2004, Yoshida.
U.S. Appl. No. 10/950,421, filed Sep. 28, 2004, Yoshida.
A. Koga, et al., Journal of Lightwave Technology, vol. 17, No. 1, pp. 43-47, "Electrostatic Linear Microactuator Mechanism for Focusing a CCD Camera", Jan. 1999.
U.S. Appl. No. 09/818,840, filed Mar. 28, 2001, Kasahara et al.
U.S. Appl. No. 09/963,424, filed Sep. 27, 2001, Akiba et al.
U.S. Appl. No. 10/243,677, filed Sep. 16, 2002, Koga et al.
U.S. Appl. No. 10/299,662, filed Nov. 20, 2002, Koga et al.
U.S. Appl. No. 10/672,434, filed Sep. 29, 2003, Koga et al.
U.S. Appl. No. 10/672,409, filed Sep. 29, 2003, Koga et al.

* cited by examiner

CAMERA UNIT HAVING LENSES MOUNTED IN MOVABLE ELEMENTS WHICH ARE MADE TO ABUT AGAINST A MOVEMENT REGULATING MEMBER

CROSS-REFERENCE TO RELATED APPLICATIONS

This application is based upon and claims the benefit of priority from the prior Japanese Patent Application No. 2002-283518, filed Sep. 27, 2002, the entire contents of which are incorporated herein by reference.

BACKGROUND OF THE INVENTION

1. Field of the Invention

The present invention relates to a camera unit in which an electrostatic actuator serves as a driving source and a camera unit controlling method.

2. Description of the Related Art

The electrostatic actuator is formed from a movable element and a stator formed in a substantially rectangular parallelopiped shape in which a moving space of the movable element is provided in a predetermined direction. Note that a gap between the stator and the movable element is set to several microns. At the movable element, electrode surfaces which are formed from convex stripe electrodes are formed on a pair of surfaces facing the inner walls of the stator. At the stator, electrode substrates in which electrodes are formed at the positions thereof facing the electrode surfaces of the stator are mounted. At the electrostatic actuator structured in this way, by supplying a voltage to the electrodes of the stator in a predetermined order, the movable element is driven by electrostatic force.

In a lens unit using the electrostatic actuator described above, there was the following problem. Namely, from the standpoint of the principle of operation of the electrostatic actuator, the electrostatic actuator cannot hold the movable element when a driving waveform is not given out toward an electrode substrate. Therefore, it is impossible to detect a position of the movable element at the time of non-driving/non-controlling, i.e., a position of a lens.

Accordingly, it is necessary for another means, for example, a position sensor or the like, to be added in order to detect the position of the movable element, and there was the problem that the cost is increased. Note that, as an actuator, there is an actuator which uses a stepping motor serving as a position encoder, and which carries out making the positions of the respective lenses to be the absolute positions.

BRIEF SUMMARY OF THE INVENTION

An object of the present invention is to provide a camera unit which can detect a position of a movable element without a special apparatus being used when a control such as a auto-focus, a zooming operation, or the like is carried out from the time of non-driving/non-controlling, and to provide a camera unit controlling method.

A camera unit of the present invention comprises: a stator; a movable element which can freely move reciprocally in a predetermined direction by being guided by the stator, and in which electrodes are formed at a pair of surfaces facing one another, and which holds a lens; an image pickup element imaging an image which was image-formed by the lens; a control unit controlling a position of the movable element; and a regulating member regulating movement of the movable element within a movable range thereof, wherein the control unit positions the movable element at a predetermined position by making the movable element abut the regulating member.

A camera unit controlling method controls a position of the movable element in a camera unit comprising a movable element which is provided so as to freely move reciprocally in the optical axis by being guided by a stator, and an image pickup element imaging an image which was image-formed by the lens, the camera unit controlling method of the present invention comprising: a moving step of making the movable element move in a predetermined direction; a regulating step of regulating movement of the movable element at a regulated position which was determined in advance; and a position controlling step of carrying out position controlling of the movable element at the regulated position.

DETAILED DESCRIPTION OF THE INVENTION

Figure 1:
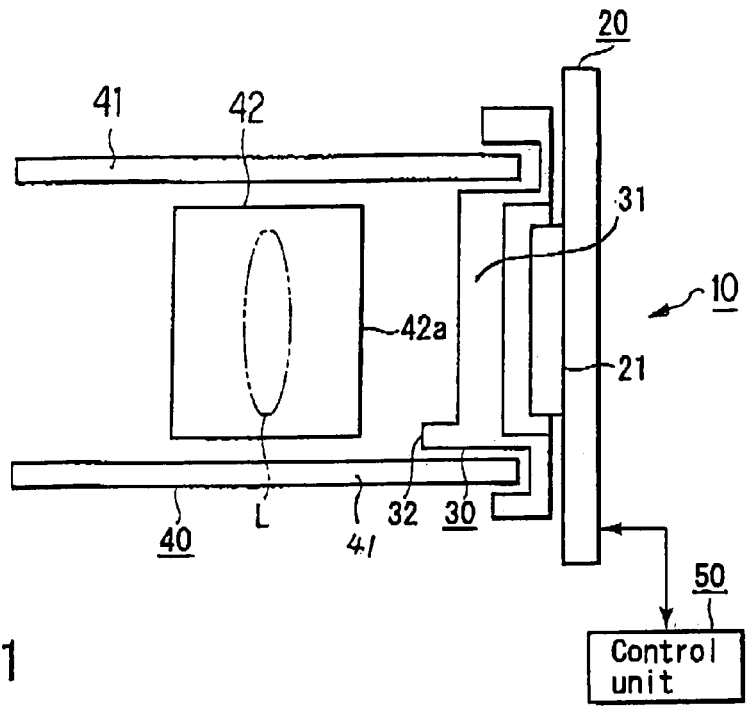
FIG. 1 is a longitudinal section showing a main portion of a camera unit relating to a first embodiment of the present invention.
Figure 2:
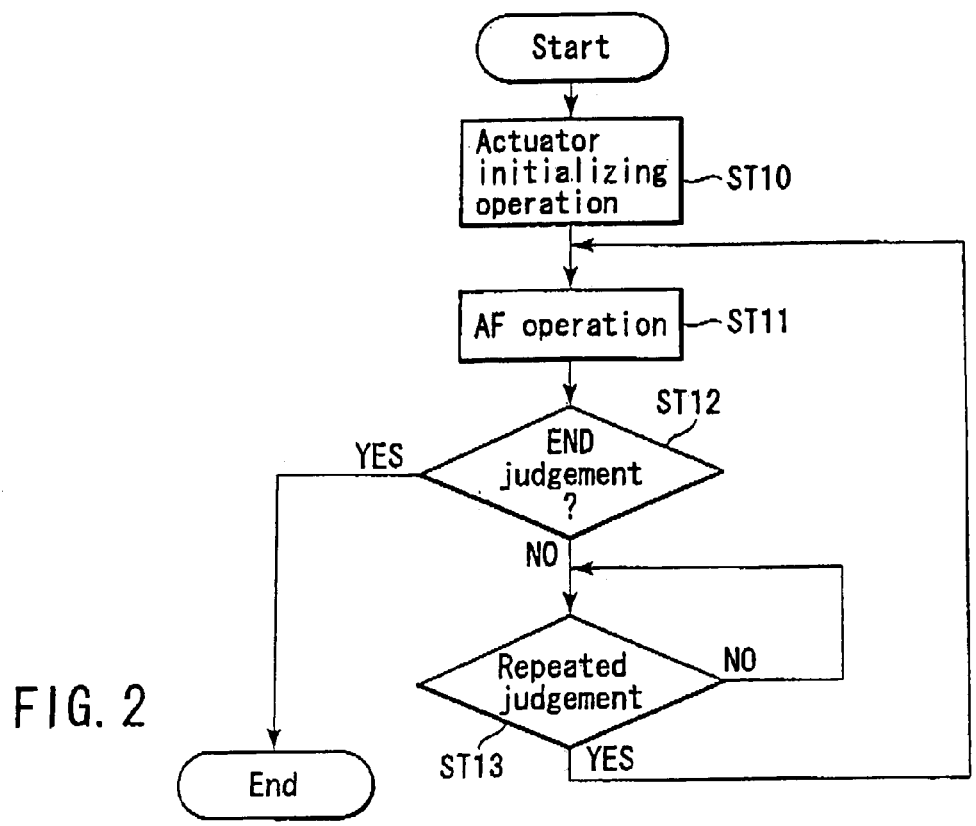
FIG. 2 is an explanatory diagram in which a procedure at the time of carrying out an auto-focus operation at then camera unit is shown by a flowchart.

FIG. 1 is a longitudinal section showing a main portion of a camera unit 10 of a first embodiment of the present invention. FIG. 2 is an explanatory diagram in which a procedure at the time of carrying out an auto-focus operation at the camera unit 10 is shown by a flowchart.

The camera unit 10 has a substrate 20, a lens unit holder 30, a lens unit 40, and a control unit 50 controlling them. An image pickup element 21 is mounted on the substrate 20. The lens unit holder 30 holds the lens unit 40, and is provided in order to dispose the image pickup element 21 and the lens unit 40 at appropriate positions. The lens unit holder 30 has a holder main body 31 and a stopper 32 projecting from the holder main body 31 to the object side. The stopper 32 is disposed so as to abut an end portion 42a at the image pickup element side of a movable element 42 which will be described later. The lens unit 40 has a pair of upper and lower electrode substrates (stators) 41 and the movable element 42.

In the camera unit 10 structured in this way, an auto-focus operation is carried out by carrying out a positioning control of the movable element 42 as follows. First, when a power source is turned on, the movable element 42 is made to move toward the image pickup element 21 side as an actuator initializing operation (ST10). At this time, although the initial position of the movable element 42 in the optical axis is unknown, the movable element 42 can be reliably stopped at the position of the stopper 32 by carrying out moving control for the time during which the movable element 42 is made to move toward the image pickup element 21 side when the movable element 42 was completely moved to the object side (the left side in the drawing).

Figure 4A:
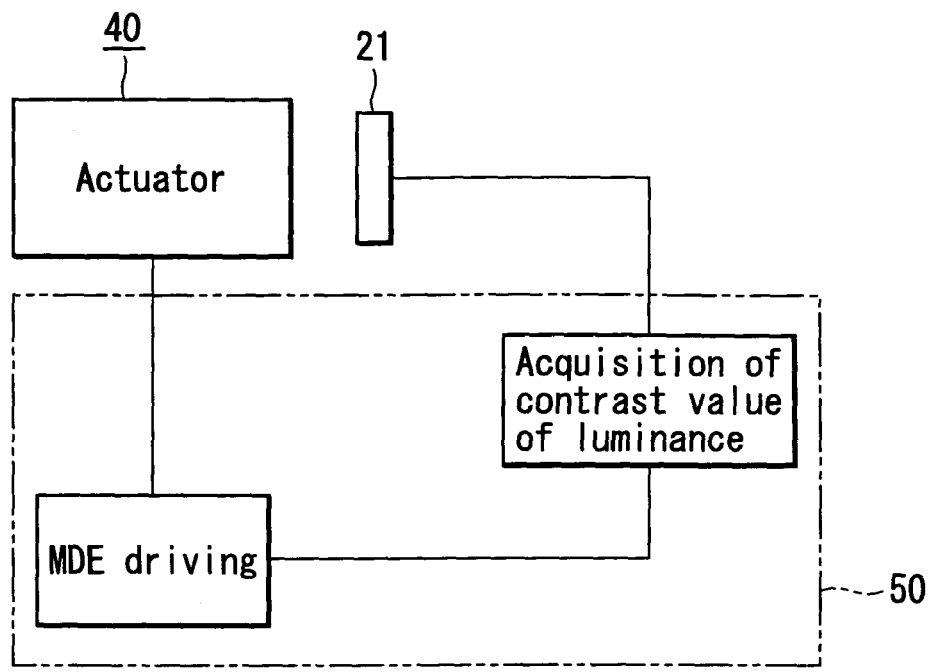
FIG. 4A and FIG. 4B are explanatory diagrams showing a principle in which a focus position is determined on the basis of a luminance value.
Figure 4B:
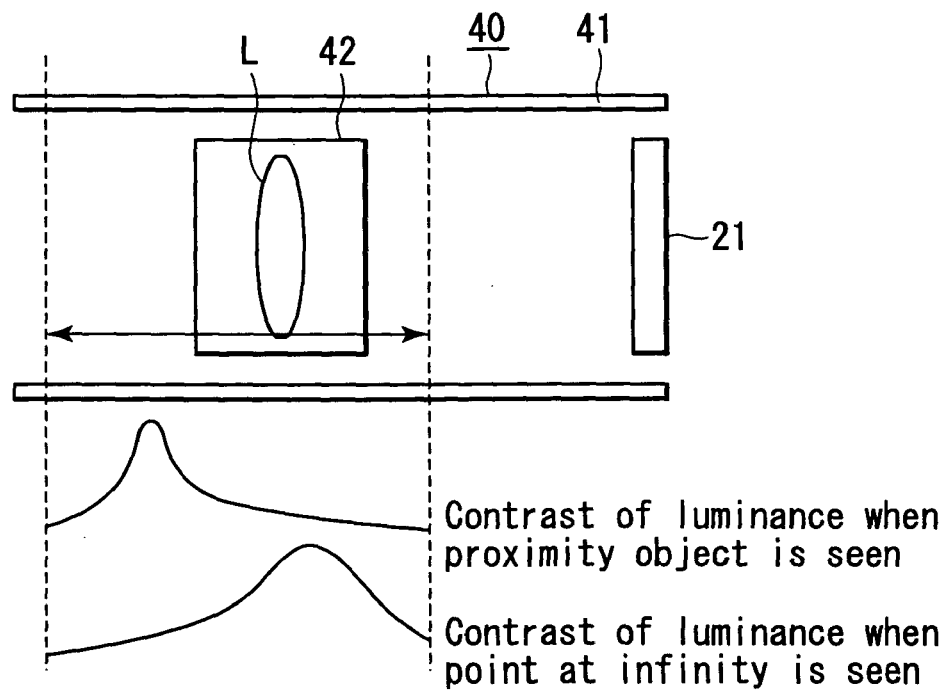

The movable element 42 is moved into auto-focus (AF) range (the region indicated by a broken line in FIG. 4B). This makes it possible to perform auto-focus operation within a short time.

The data representing the position that the movable element 42 takes the immediately preceding auto-focus operation is completed may be stored in a memory. In this case, the movable element 42 is first initialized and then moved into the AF range for the previous auto-focus operation. In this method, the camera unit 10 can restore the last photographing condition.

Figure 3A:
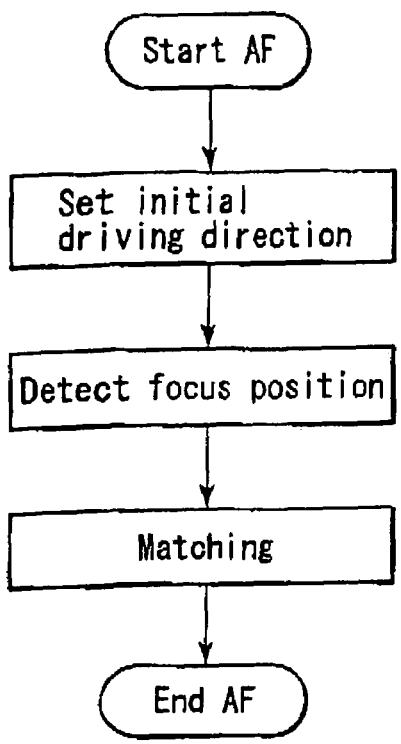
FIG. 3A and FIG. 3B are explanatory diagrams showing auto-focus operations by flowcharts.
Figure 3B:
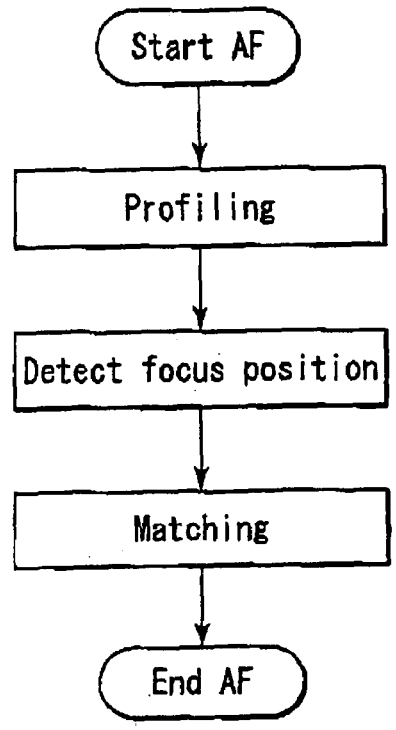

Next, an auto-focus operation is carried out (ST11). Note that two types of methods can be considered as an auto-focus operation, as shown in FIGS. 3A, 3B. In both operations, as shown in FIG. 4A, a contrast value of luminance at the image pickup element 21 is acquired at the control unit 50. As shown in FIG. 4B, the contrast value changes according to the distance to the object.

The contrast value of the image will be described in detail. The output from the image pickup element 21 contains coordinate data (x, y) representing the position of the image and color data (RGB) representing the color of the image. To obtain the contrast value of the image, the color data for the focus region (e.g., a central ninth of the image) is first acquired from the output of the image pickup element 21. Next, the color data thus acquired is converted to luminance data, or the green data items contained in the color data is converted into luminance data. Further, the following value is calculated for each pixel position (x, y) in the focus region:

$$(-1) \times (x-1, y) + (+1) \times (x+1, y) \tag{1}$$

This value cannot be obtained for pixels at either end of the abscissa, however. The values calculated for all pixels, but those at either end of the abscissa, are added together. The resultant sum is the contrast value of the image.

In the method shown in FIG. 3A, an auto-focus is started, and when an initial driving direction is set, a history of contrast values of luminance is acquired while the movable element 42 is moving. The time when the history of the contrast values varies from rising to falling during movement is the point at which the focus position is found, thus the focus position is detected. Further, the movable element 42 is made to return to the position when the history of the contrast values varies from rising to falling, and matching is carried out.

On the other hand, in the method shown in FIG. 3B, contrast values of luminance are acquired over the entire movable range of the movable element 42. This operation is called profiling. A position where the contrast value of luminance becomes maximum is detected as the focus position on the basis of a result of the profiling, and matching is carried out by making the movable element 42-move toward that position.

Next, it is judged whether the auto-focus operation is completed or not (ST12), and if the auto-focus operation is completed, movement of the movable element 42 is completed, and when the auto-focus operation is not completed, the routine proceeds to ST13. A repeated judging is carried out at ST13, and when a repetition is carried out, the routine returns to ST11.

In this way, in the camera unit 10 relating to the first embodiment, even if a position sensor for detecting a position of the movable element 42 is not provided, due to the movable element 42 being made to move toward the position of the stopper 32, i.e., the initial position, once at the time of starting control, a position of the movable element 42 can be specified, and it is possible for the following auto-focus operation to be carried out. Note that, after the position of the movable element 42 once reaches the initial position, when a previous end position at the point in time when the power source was turned off is stored, the position of the movable element 42 may be controlled so as to move toward the previous end position (i.e., auto-focus range). Further, due to the stopper 32 being provided at the image pickup element 21 side, the camera unit 10 is also applicable when a focal length of the lens is short.

Note that, in the example described above, the stopper 32 projects from the holder main body 31 to the object side. However, the holder main body 31 is made to serve as the stopper 32, and it may be structured such that the stopper 32 does not project to the object side.

The movable element 42 may be dislocated from its desired position when the actuator receives an external force greater than the drive force. If the movable element 42 moves too much, the auto-focus method described above may fail to determine the focus position. If the focal position is not determined after several trials, the actuator is initialized to operate. When the actuator is initialized, the position the movable element 24 can take is limited to some extent, unlike at the time the power switch to the camera unit 10 is turned on. Thus, the element 24 moves toward the stopper 32, but for a shorter distance than when the power switch is turned on. To find the distance the element 24 should move when the actuator is initialized, a predetermined distance for compensating the dislocation of the element 24 is added to the distance between the stopper 32 and the position the element 42 assumes immediately before the actuator is initialized.

Figure 5:
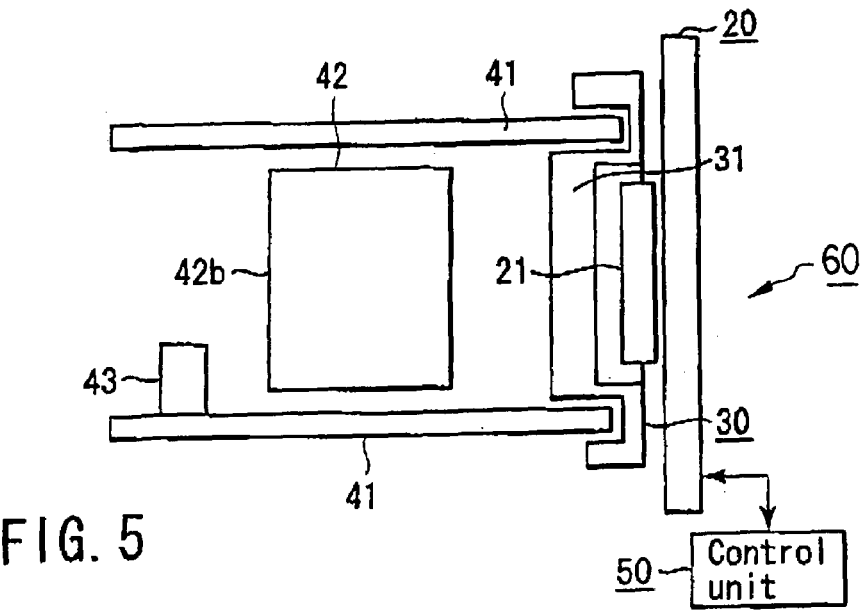
FIG. 5 is a longitudinal section showing a main portion of a camera unit relating to a second embodiment of the present invention.

FIG. 5 is a longitudinal section showing a main portion of a camera unit 60 of a second embodiment of the present invention. Note that, in FIG. 5, parts which have the same functions as those of FIG. 1 are denoted by the same reference numerals, and detailed description thereof will be omitted.

The camera unit 60 has the substrate 20, the lens unit holder 30, the lens unit 40, and the control unit 50 controlling them. The lens unit holder 30 has the holder main body 31.

The lens unit 40 has the pair of upper and lower electrode substrates (stators) 41, the movable element 42, and a stopper 42 provided at the end portion at the object side of the electrode substrate 41. The stopper 43 is disposed so as to abut an end portion 42b at the object side of a movable element 42 and regulate the movement thereof.

The camera unit 60 structured in this way is different from the camera unit 10 described above in a point that the movable element 42 is made to move toward the object side. However, the camera unit 60 carries out an initializing operation in the same way as in the camera unit 10. Note that the same effect as in the camera unit 10 can be obtained in the camera unit 60. Further, due to the stopper 43 being provided at the object side, the camera unit 60 is also suitable for a lens of a long focus length.

Figure 6:
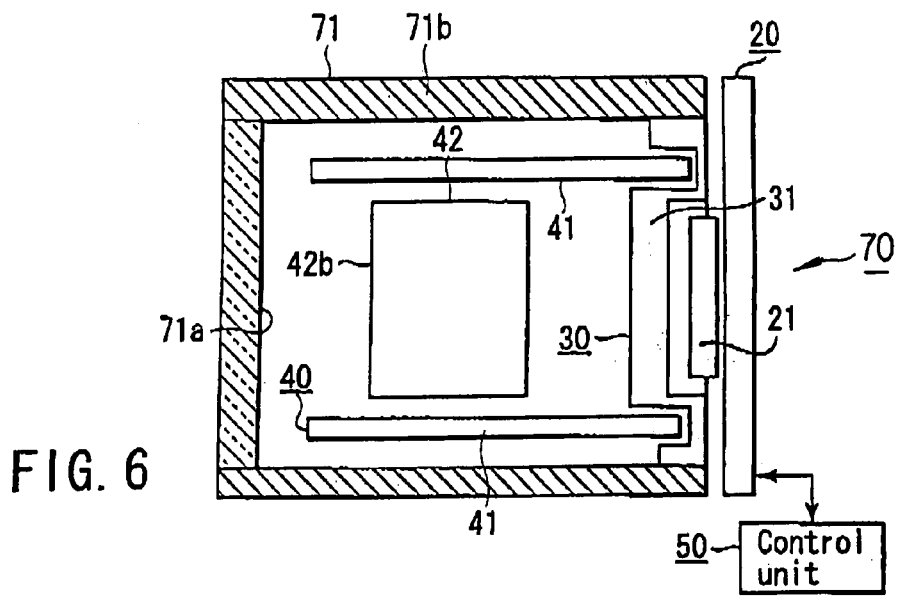
FIG. 6 is a longitudinal section showing a main portion of a camera unit relating to a third embodiment of the present invention.

FIG. 6 is a longitudinal section showing a main portion of a camera unit 70 of a third embodiment of the present invention. Note that, in FIG. 6, parts which have the same functions as those of FIG. 1 are denoted by the same reference numerals, and detailed description thereof will be omitted.

The camera unit 70 has the substrate 20, the lens unit holder 30, the lens unit 40, the control unit 50 controlling them, a cover 71 covering the lens unit holder 30 and the lens unit 40. The lens unit holder 30 has the holder main body 31. The lens unit 40 has the pair of upper and lower electrode substrates (stators) 41 and the movable element 42.

The cover 71 is formed in a closed-end tube shape, and has a transparent bottom portion 71a and a tube portion 71b having a shading ability. The bottom portion 71a is disposed at the object side of the lens unit 40, and the bottom portion 71a serves as a stopper. Namely, the bottom portion 71a is disposed so as to abut the end portion 42b at the object side of the movable element 42 and regulate the movement thereof.

In the camera unit 70 structured in this way, an initializing operation is carried out in the same way as in the camera unit 60. Note that the same effect as in the camera unit 10 can be obtained in the camera unit 70, and because it is possible for the movable element 42 to be moved over the entire region between the both end portions of the electrode substrates 41 in the optical axis, a broad a focus adjusting range is possible. Note that, because the bottom portion 71a of the cover 71 contacts the movable element 42, there are cases in which the bottom portion 71a of the cover 71 is damaged. Therefore, in accordance with modification examples shown in FIGS. 7A, 7B, it is possible to prevent the problem that a transparent member is damaged due to the movable element 42 contacting the cover.

Figures 7A, 7B:
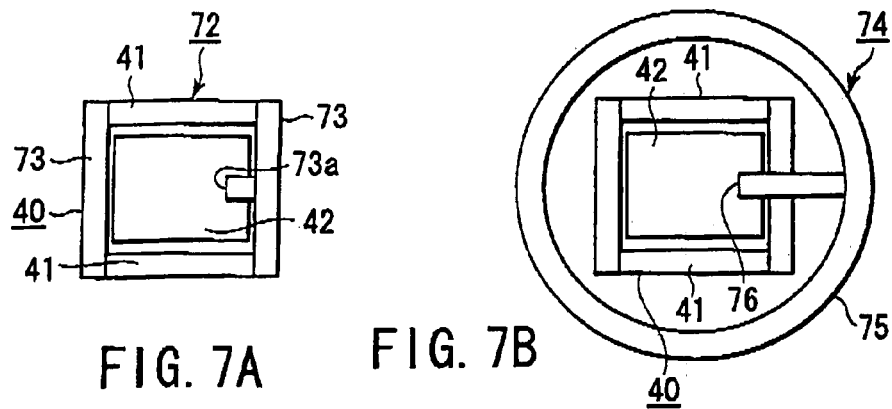
FIG. 7A and FIG. 7B are front views showing modification examples of the camera unit.

FIG. 7A is a front view showing a main portion of a camera unit 72 relating to the first modification example of the third embodiment described above. Note that, in FIG. 7A, parts which have the same functions as those of FIG. 6 are denoted by the same reference numerals, and detailed description thereof will be omitted.

In the camera unit 72, a stopper 73a is provided at the end portion at the object side of supporting plates 73 supporting the electrode substrates 41. The same effect as in the camera unit 70 can be obtained in the present modification example.

FIG. 7B is a front view showing a main portion of a camera unit 74 relating to the second modification example of the third embodiment which was described above. Note that, in FIG. 7B, parts which have the same functions as those of FIG. 6 are denoted by the same reference numerals, and detailed description thereof will be omitted.

In the camera unit 74, a stopper 76 is provided at the end portion at the object side of a cover 75 covering the lens unit holder 30 and the lens unit 40. The same effect as in the camera unit 70 can be obtained in the present modification example, and because it is not necessary for the cover 75 to be transparent, a degree of freedom for selecting a material increases.

Figure 8:
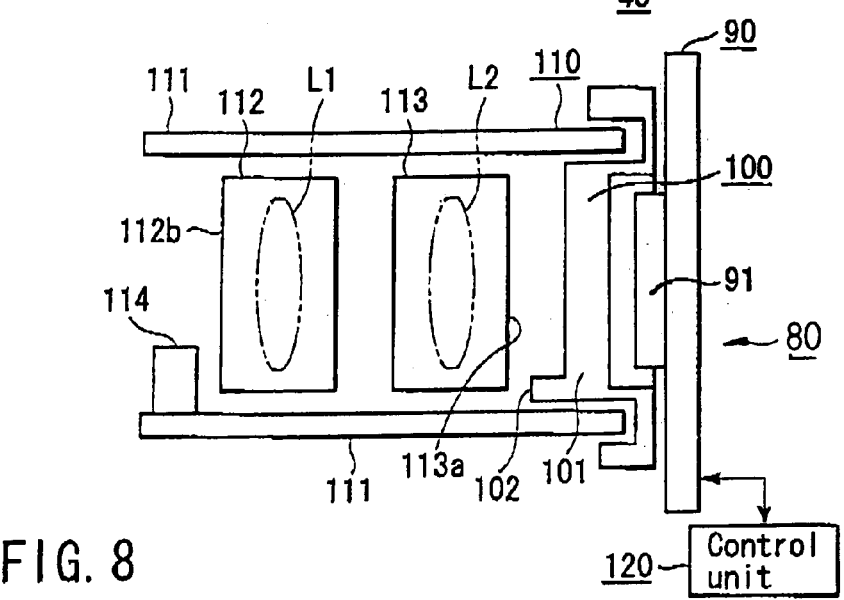
FIG. 8 is a longitudinal section showing a main portion of a camera unit relating to a fourth embodiment of the present invention.
Figure 9:
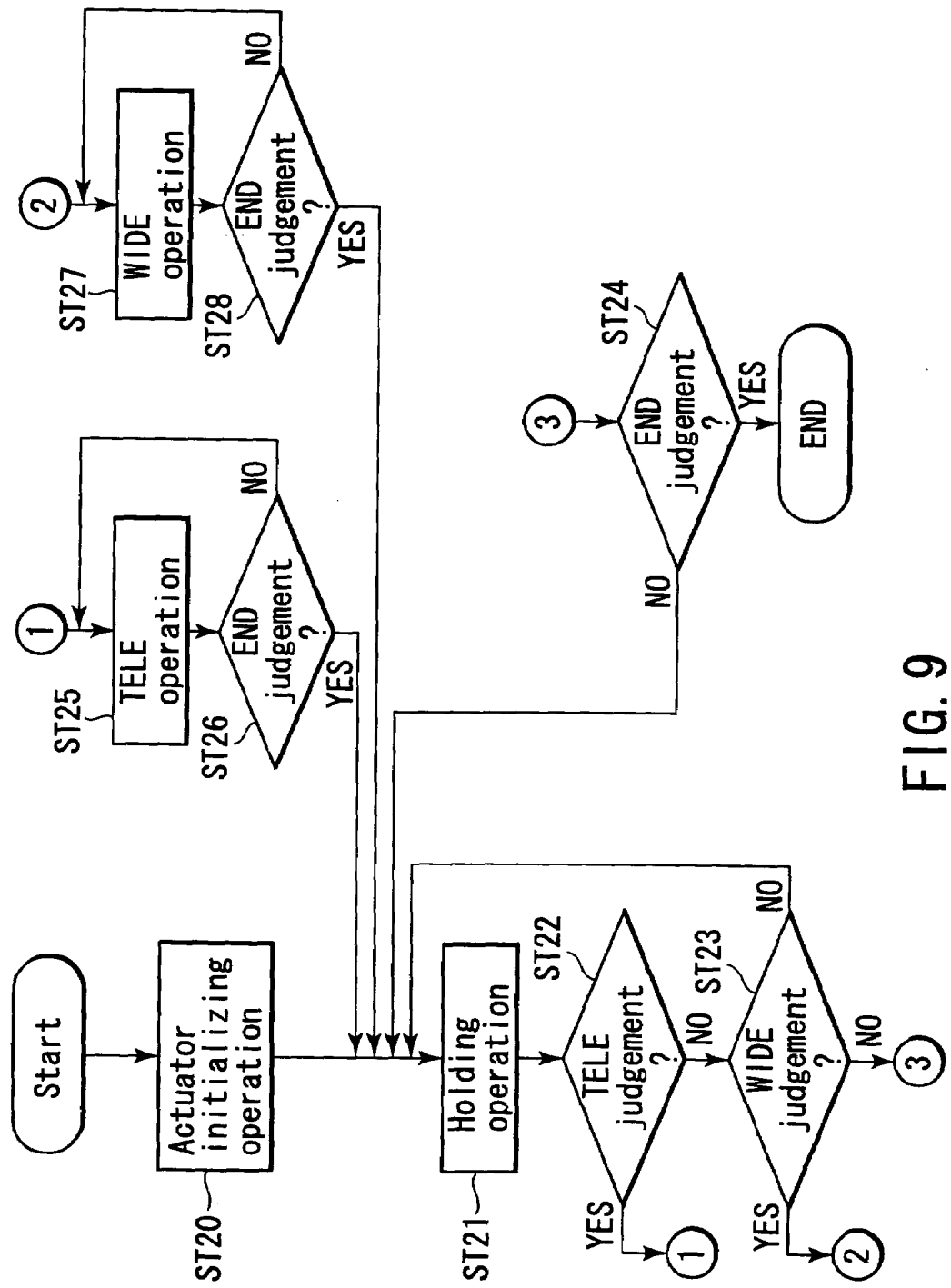
FIG. 9 is an explanatory diagram in which a procedure at the time of carrying out a zooming operation at the camera unit is shown by a flowchart.

FIG. 8 is a longitudinal section showing a main portion of a camera unit 80 relating to a fourth embodiment of the present invention. FIG. 9 is an explanatory diagram in which a procedure at the time of carrying out a zooming operation of the camera unit 80 is shown by a flowchart.

The camera unit 80 has a substrate 90, a lens unit holder 100, a lens unit 110, and a control unit 120 controlling them. An image pickup element 91 is mounted on the substrate 90. The lens unit holder 100 holds the lens unit 110, and is provided in order to dispose the image pickup element 91 and the lens unit 110 at appropriate positions. The lens unit holder 100 has a holder main body 101 and a stopper 102 projecting from the holder main body 101 to the object side. The stopper 102 is disposed so as to abut an end portion 113a at the image pickup element side of a second movable element 113 which will be described later. The lens unit 110 has a pair of upper and lower electrode substrates (stators) 111, a first movable element 112 and the second movable element 113, and a stopper 114 provided at the end portion at the object side of the electrode substrate 111. The stopper 114 is disposed so as to abut an end portion 112b of the object side of the first movable element 112 and regulate the movement thereof.

In the camera unit 80 structured in this way, a zooming operation is carried out by carrying out the positioning controls of the first movable element 112 and the second movable element 113 as follows. First, when a power source is turned on, as an actuator initializing operation, the first movable element 112 is made to move toward the object side and the second movable element 113 is made to move toward the image pickup element 91 side (ST20). At this time, although the initial positions of the first movable element 112 and the second movable element 113 in the optical axis are unknown, the first movable element 112 and the second movable element 113 can be exactly stopped at the positions of the stoppers 114, 102 by carrying out moving control for the time during which the first movable element 112 and the second movable element 113 are made to respectively move toward the object side and the image pickup element 91 side when the first movable element 112 and the second movable element 113 were respectively and completely moved toward the image pickup element 91 side and the object side.

Then, the first movable element 112 and the second movable element 113 are moved from the WIDE end to given points on the zoom curve (FIG. 11A) of the TELE end. Therefore, the auto-focus operation and the zoom operation can be performed within a shorter time. The elements 112 and 113 may be moved back to the points on the zoom curve, where they were located when the preceding auto-focus operation completed.

Next, holding operations of the first movable element 112 and the second movable element 113 (ST21) are carried out, and a TELE judgement (ST22) and a WIDE judgement (ST23) are carried out. When the both judgements are NO, an END judgement (ST24) is carried out, and when the END judgement is YES, the routine is completed, and when the END judgement is NO, the routine returns to ST21.

When it is YES at the TELE judgement (ST22), a TELE operation (ST25) is carried out, and when it is YES at the END judgement (ST26), the routine returns to ST21. When it is NO at the END judgement, the TELE operation (ST25) is repeatedly carried out.

Figure 10:
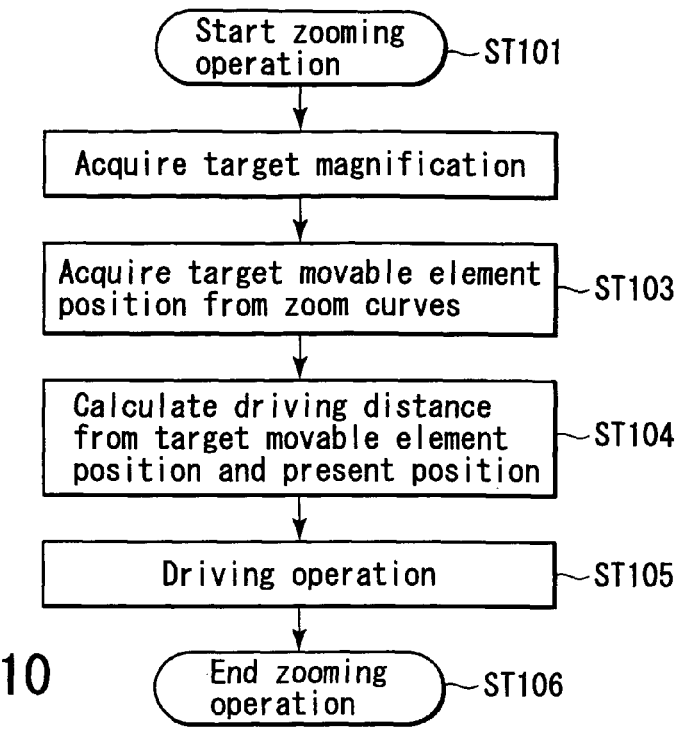
FIG. 10 is an explanatory diagram showing a zooming operation by a flowchart.
Figure 11A:
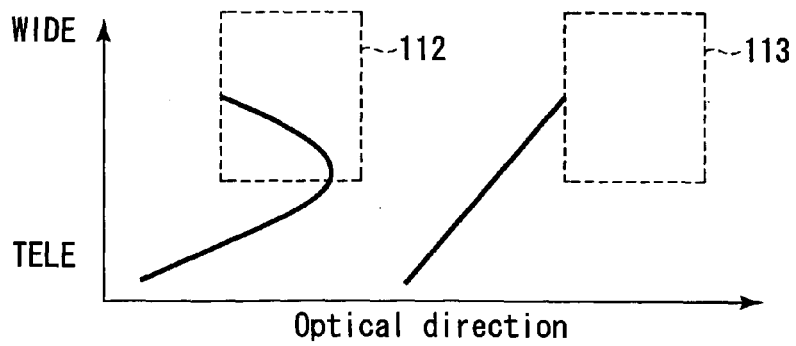
FIG. 11A and FIG. 11B are explanatory diagrams showing the zoom curves expressing the relationship between a target magnification and a target movable element position.
Figure 11B:
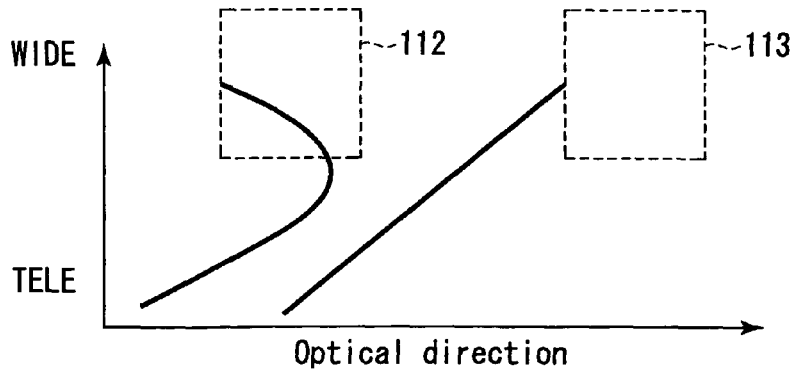

Here, a zooming operation will be described with reference to FIG. 10. When a zooming operation is started (ST101), first, a target magnification is acquired (ST102). Next, target movable element positions are acquired from the target magnification on the basis of zoom curves as shown in FIG. 11A and FIG. 11B (ST103). Next, a driving distance is calculated on the basis of the target movable element positions and the present positions of the first movable element 112 and the second movable element 113 (ST104), and a driving operation is carried out (ST105), and the zooming operation is completed (ST106). Note that FIG. 11A shows a case in which the moving ranges of the first movable element 112 and the second movable element 113 do not overlap each other, and FIG. 11B shows a case in which the moving ranges of the first movable element 112 and the second movable element 113 are overlap each other.

On the other hand, when it is YES at the WIDE judgement (ST23), a WIDE operation (ST27) is carried out, and when it is YES at an END judgement (ST28), the routine returns to ST21. When it is NO at the END judgement, the WIDE operation (ST27) is carried out.

In this way, for the camera unit 80 relating to the fourth embodiment, even when a position sensor for detecting the positions of the first movable element 112 and the second movable element 113 in the optical axis is not specially provided, due to the first movable element 112 and the second movable element 113 being made to move toward the positions of the stoppers 114, 102, i.e., the initial positions, once at the time of starting the control, the positions of the first movable element 112 and the second movable element 113 can be specified, and it is possible for the following zooming operation to be carried out.

Figure 12:
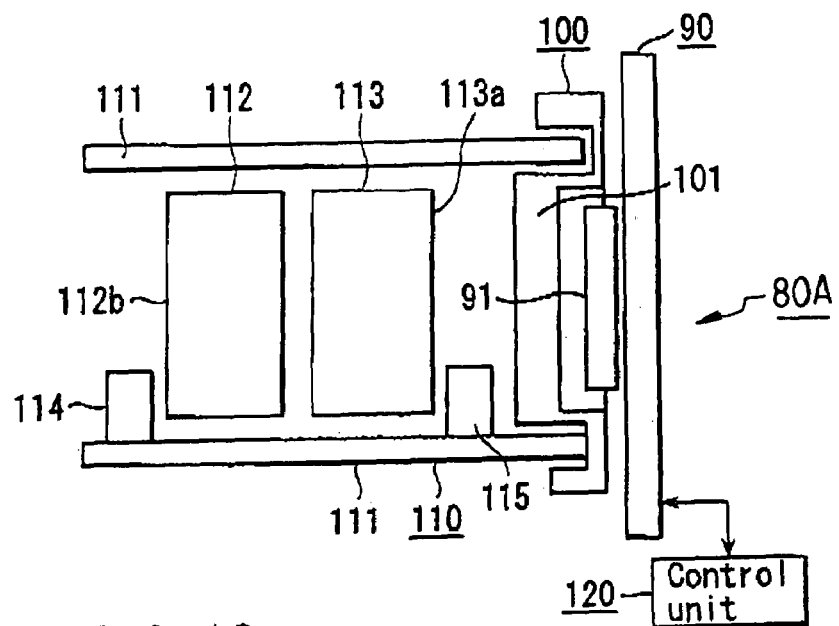
FIG. 12 is a longitudinal section showing a main portion of a camera unit relating to a fifth embodiment of the present invention.

FIG. 12 is a longitudinal section showing a main portion of a camera unit 80A relating to a fifth embodiment of the present invention. Note that, in FIG. 12, parts which have the same functions as those of FIG. 8 are denoted by the same reference numerals, and detailed description thereof will be omitted.

The camera unit 120 has a stopper 115 provided at the end portion at the object side of the electrode substrate 111 in place of the stopper 102. The stopper 115 is disposed so as to abut an end portion 113a at the image pickup element 91 side of the second movable element 113 and regulate the movement thereof.

The same effect as in the camera unit 80 can be obtained in the camera unit 120 structured in this way.

Figure 13:
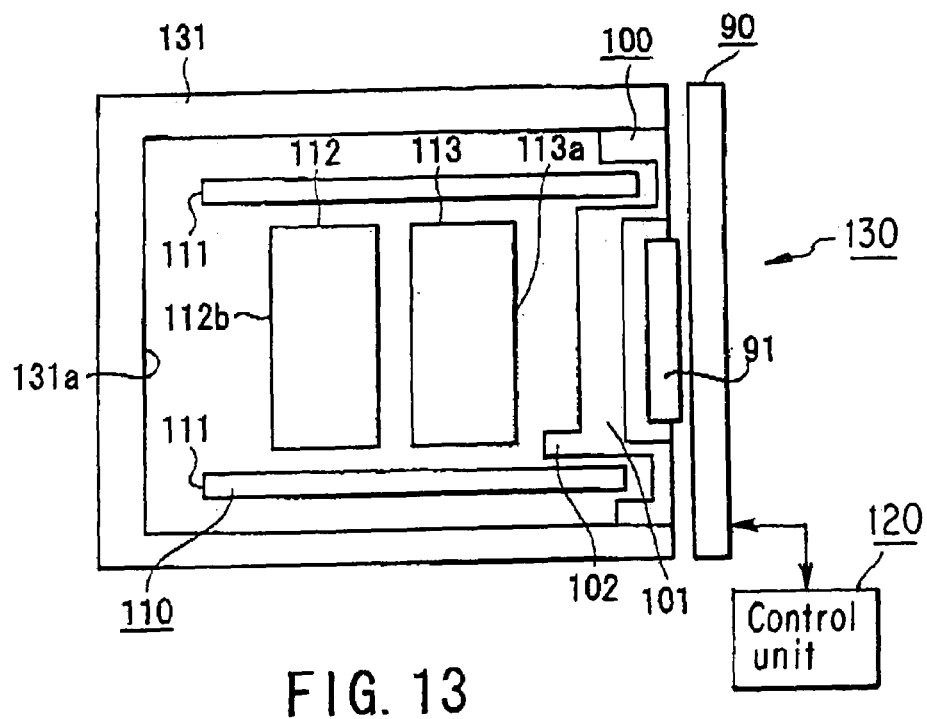
FIG. 13 is a longitudinal section showing a main portion of a camera unit relating to a sixth embodiment of the present invention.

FIG. 13 is a longitudinal section showing a main portion of a camera unit 130 relating to a sixth embodiment of the present invention. Note that, in FIG. 13, parts which have the same functions as those of FIG. 8 are denoted by the same reference numerals, and detailed description thereof will be omitted.

The camera unit 130 has the substrate 90, the lens unit holder 100, the lens unit 110, the control unit 120 controlling them, and a transparent cover 131 covering the lens unit holder 100 and the lens unit 110. The lens unit holder 100 has the holder main body 101 and the stopper 102 projecting from the holder main body 101 to the object side. The stopper 102 is disposed so as to abut the end portion 113a at the image pickup element side of the second movable element 113 which will be described later. The lens unit 110 has the pair of upper and lower electrode substrates (stators) 111, and the first movable element 112 and the second movable element 113.

The cover 131 is formed in a closed-end tube shape, and a bottom portion 131a thereof is disposed at the object side of the lens unit 110, and the bottom portion 131a serves as a stopper. Namely, the bottom portion 131a is disposed so as to abut the end portion 112b at the object side of the first movable element 112 and regulate the movement thereof.

In the camera unit 130 structured in this way, an initializing operation and a zooming operation are carried out in the same way as in the camera unit 80. The same effect as in the camera unit 80 can be obtained in the camera unit 130, and because it is possible for the first movable element 112 and the second movable element 113 to be moved over the entire region between the both end portions of the electrode substrates 111 in the optical axis, a broad focus adjusting range is possible.

Figure 14:
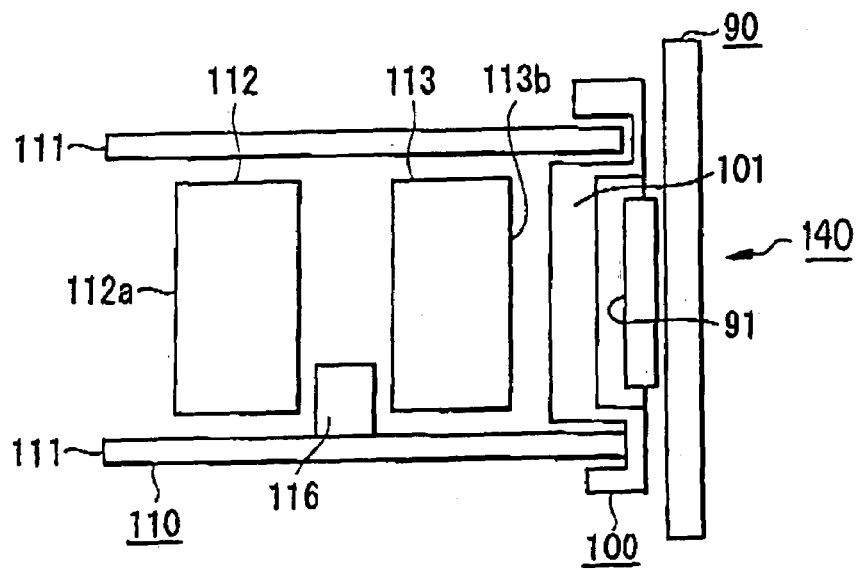
FIG. 14 is a longitudinal section showing a main portion of a camera unit relating to a seventh embodiment of the present invention.

FIG. 14 is a longitudinal section showing a main portion of a camera unit 140 relating to a seventh embodiment of the present invention. Note that, in FIG. 14, parts which have the same functions as those of FIG. 8 are denoted by the same reference numerals, and a detailed description thereof will be omitted.

The camera unit 140 has the substrate 90, the lens unit holder 100, the lens unit 110, and the control unit 120 controlling them.

The lens unit holder 100 has the holder main body 101. The lens unit 110 has the electrode substrates 111, the first movable element 112 and the second movable element 113, and a stopper 116 provided at the intermediate portion in the optical axis of the electrode substrate 111. The stopper 116 is disposed so as to abut an end portion 112b at the image pickup element 91 side of the first movable element 112 and regulate the movement thereof, and is disposed so as to abut the end portion 113a at the object side of the second movable element 113 and regulate the movement thereof.

In the camera unit 140 structured in this way, although moving directions at the time of initializing the first movable element 112 and the second movable element 113 are different from those of the camera unit 80, the initializing operations are carried out in the same way. The camera unit 140 is effective in a case in which the zoom curves are not overlapped, as shown in FIG. 11A. Note that the same effect as in the camera unit 80 can be obtained in the camera unit 140, and because only one stopper is required for positioning the two movable elements, the structure is simplified.

Figure 15:
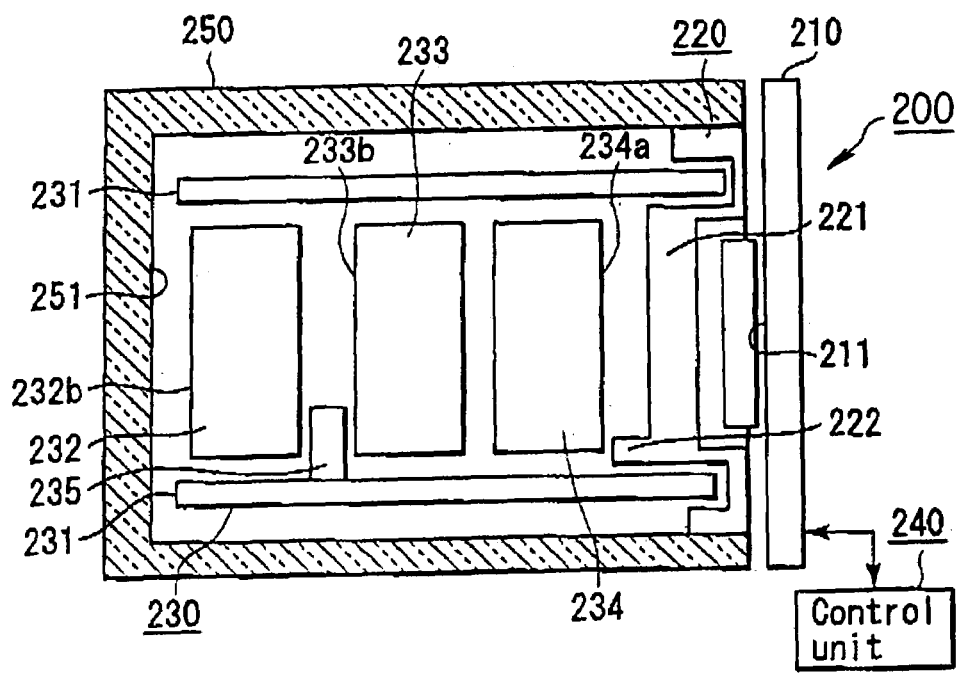
FIG. 15 is a longitudinal section showing a main portion of a camera unit relating to an eighth embodiment of the present invention.

FIG. 15 is a longitudinal sectional view showing a main portion of a camera unit 200 relating to an eighth embodiment of the present invention.

The camera unit 200 has a substrate 210, a lens unit holder 220, a lens unit 230, a control unit 240 controlling them, and a transparent cover 250 covering the lens unit holder 220 and the lens unit 230.

An image pickup element 211 is mounted on the substrate 210. The lens unit holder 220 holds the lens unit 230, and is provided in order to dispose the image pickup element 211 and the lens unit 230 at appropriate positions. The lens unit holder 220 has a holder main body 221 and a stopper 222 projecting from the holder main body 221 to the object side. The stopper 222 is disposed so as to abut an end portion 234a at the image pickup element side of a third movable element 234 which will be described later. The lens unit 230 has a pair of upper and lower electrode substrates (stators) 231, a first movable element 232, a second movable element 233, the third movable element 234, and a stopper 235 provided at the intermediate portion between the first movable element 232 and the second movable element 233 in the optical axis of the electrode substrates 231. The stopper 235 is disposed so as to abut an end portion 233b at the object side of the second movable element 233 and regulate the movement thereof.

The cover 250 is formed in a closed-end tube shape, and a bottom portion 251 thereof is disposed at the object side of the lens unit 230, and the bottom portion 251 serves as a stopper. Namely, the bottom portion 251 is disposed so as to abut the end portion 232b at the object side of the first movable element 232 and regulate the movement thereof.

In the camera unit 200 structured in this way, by carrying out an initializing operation in the same way as in the camera unit 80 described above, even when three movable elements are provided thereat, the same effect as in the camera unit 80 can be obtained.

Figure 16A:
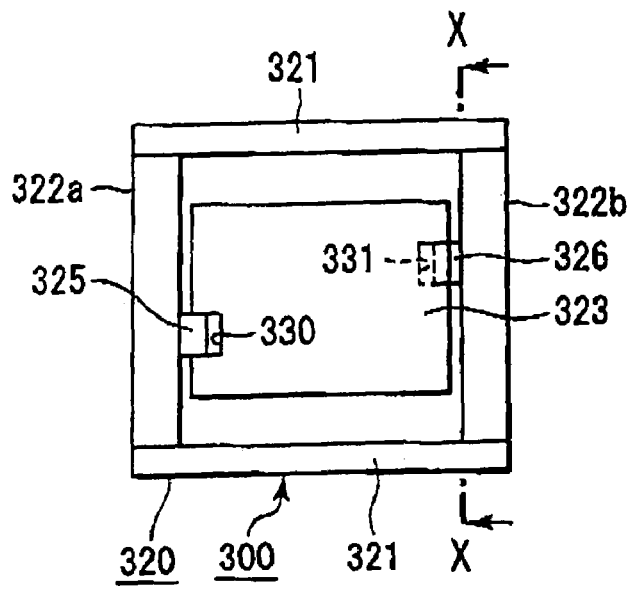
FIG. 16A is a front view showing a main portion of a camera unit relating to a ninth embodiment of the present invention.
Figure 16B:
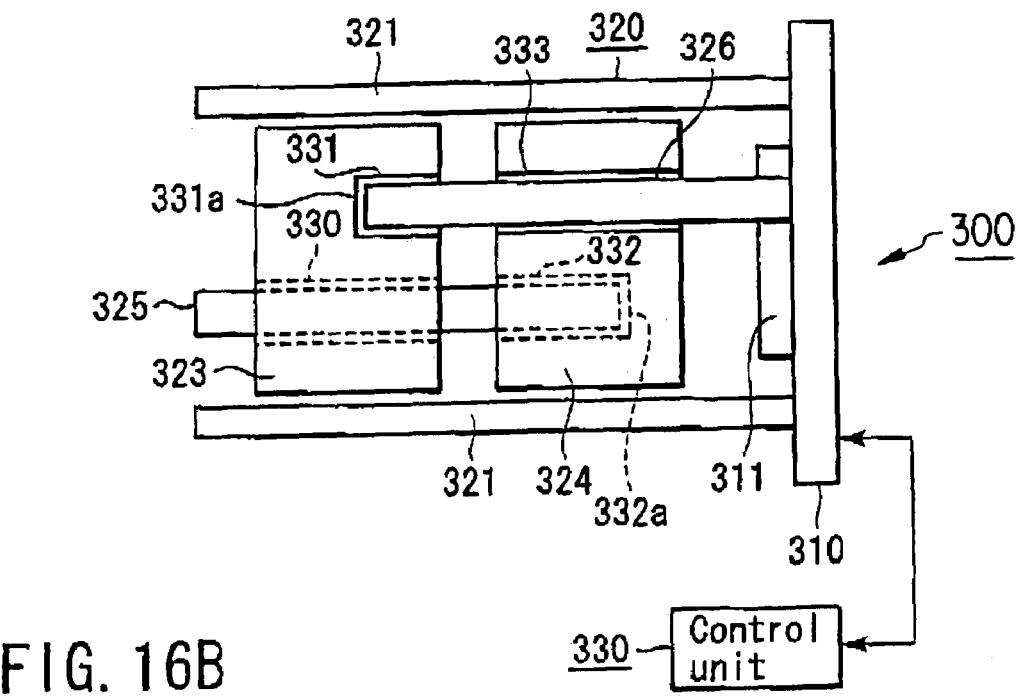
FIG. 16B is a sectional view along line X-X of FIG. 16A seen from the arrow direction.

FIG. 16A and FIG. 16B are diagrams showing main portions of a camera unit 300 relating to a ninth embodiment of the present invention. FIG. 16A is a front view, and FIG. 16B is a section in which the main portion is cut along line X-X of FIG. 16A and seen from the arrow direction.

The camera unit 300 has a substrate 310, a lens unit 320, and a control unit 330 controlling them.

An image pickup element 311 is mounted on the substrate 310. The lens unit 320 has a pair of upper and lower electrode substrates (stators) 321, supporting members 322a, 322b supporting these electrode substrates 321, and a first movable element 323 and a second movable element 324.

The supporting member 322a has a guide stopper 325 provided so as to extend along the optical axis, and the supporting member 322b has a guide stopper 326 provided so as to extend along the optical axis. The guide stopper 325 is provided so as to direct to the substrate 310 side up to about ¾ from the end portion at the object side of the supporting member 322a, and the guide stopper 326 is provided so as to direct to the object side up to about ¾ from the end portion at the substrate 310 side of the supporting member 322b.

Further, groove portions 330, 331 are provided at the first movable element 323, and the groove portions 330, 331 are respectively engaged with the guide stoppers 325, 326 so as to be freely rockable. At the groove portion 331, an abutting portion 331a is formed at a midway portion of the first movable element 323 in the optical axis, and the abutting portion 331a is disposed so as to abut a distal end portion 326a of the guide stopper 326 and regulate the movement of the first movable element 323.

Moreover, groove portions 332, 333 are formed at the second movable element 324, and the groove portions 332, 333 are respectively engaged with the guide stoppers 325, 326 so as to be freely rockable. At the groove portion 332, an abutting portion 332a is formed at a midway portion of the second movable element 324 in the optical axis, and the abutting portion 332a is disposed so as to abut a distal end portion 325a of the guide stopper 325 and regulate the movement of the second movable element 324.

In the camera unit 300 structured in this way, it is possible for an initializing operation to be carried out by regulating the movements of the first movable element 323 and the second movable element 324 by the guide stoppers 325, 326. Accordingly, an initializing operation and a zooming operation are carried out in the same way as in the camera unit 80 described above. The camera unit 300 is effective in a case in which the zoom curves are overlapped, as shown in FIG. 11B.

The same effect as in the camera unit 80 can be obtained in the camera unit 300 structured in this way, and regardless of the fact that the structure thereof is complicated, an initializing time can be shortened in a case of an optical design in which the first movable element 323 and the second movable element 324 are close at the initial positions of zooming (WIDE positions).

Note that the present invention is not limited to the above-described embodiments. Various modifications and implements are possible within a range which does not deviate from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera unit comprising:
   a plurality of movable elements holding a plurality of lenses;
   a stator supporting the movable elements so as to freely move reciprocally along the optical axis of the lens;
   an image pickup element imaging an image which was image-formed by the lens;
   a regulating member which regulates movement of the movable elements within a movable range thereof;
   a control unit controlling movement of the movable elements in order to detect a position of the movable element by making the movable elements abut the regulating member;
   wherein a first groove portion which is formed along the optical axis of the lenses and in which a basic end portion thereof is provided at the object side is formed at a first movable element among said plurality of movable elements, and
   a second groove portion which is formed along the optical axis of the lenses and in which a basic end portion thereof is provided at the image pickup element side is formed at a second movable element among said plurality of movable elements, and
   the regulating member has a first member in which a distal end portion thereof is extendedly provided so as to direct toward the object side along the optical axis of the lenses in the stator, and which is not engaged with the first movable element, and in which the distal end portion thereof abuts the basic end portion of the second groove portion, and
   a second member in which a distal end portion thereof is extendedly provided so as to direct toward the image pickup element side along the optical axis of the lenses in the stator, and which is not engaged with the second movable element, and in which the distal end portion thereof abuts the basic end portion of the first groove portion.

* * * * *